(12) United States Patent
Piratla (10) Patent No.: US 8,224,836 B1
(45) Date of Patent: Jul. 17, 2012

(54) SEARCHING IN MULTIPLE LANGUAGES

(75) Inventor: Pavan Ram Piratla, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/287,767

(22) Filed: Nov. 2, 2011

(51) Int. Cl.
*G06F 17/30* (2006.01)

(52) U.S. Cl. ....................................... 707/759; 707/769

(58) Field of Classification Search .................. 707/759, 707/769
See application file for complete search history.

(56) References Cited

U.S. PATENT DOCUMENTS

| | | | | |
|---|---|---|---|---|
| 7,111,237 | B2 * | 9/2006 | Chan | 715/265 |
| 7,634,720 | B2 | 12/2009 | Haluptzok et al. | |
| 8,010,465 | B2 | 8/2011 | Badger et al. | |
| 2006/0271621 | A1 * | 11/2006 | Berry et al. | 709/203 |
| 2007/0266024 | A1 * | 11/2007 | Cao | 707/6 |
| 2008/0221866 | A1 * | 9/2008 | Katragadda et al. | 704/3 |
| 2008/0249992 | A1 * | 10/2008 | Goedecke et al. | 707/3 |
| 2008/0288474 | A1 * | 11/2008 | Chin et al. | 707/4 |
| 2009/0125497 | A1 * | 5/2009 | Jiang et al. | 707/4 |
| 2009/0327313 | A1 | 12/2009 | Kung et al. | |
| 2010/0106704 | A1 * | 4/2010 | Josifovski et al. | 707/708 |
| 2010/0217795 | A1 | 8/2010 | Hong | |
| 2011/0113064 | A1 * | 5/2011 | Govindachetty et al. | 707/771 |
| 2011/0191364 | A1 * | 8/2011 | LeBeau et al. | 707/767 |
| 2011/0202330 | A1 * | 8/2011 | Dai et al. | 704/2 |

OTHER PUBLICATIONS

2lingual home page URL: www.2lingual.com, retrieved from the internet on Nov. 2, 2011, 1 page.
Google home page URL: www.google.in, retrieved from the internet on Nov. 2, 2011, 1 page.
Transliterate—Definition and More from the Free Merriam-Webster Dictionary: www.merriam-webster.com/dictionary/transliterate, retrieved from the internet on Mar. 1, 2012, 2 pages.
Download Google Transliteration Input Method (IME): http://www.google.com/ime/transliteration/, retrieved from the Internet on Mar. 1, 2012, 1 page.
Google Translate: http://translate.google.com/, retrieved from the Internet on Mar. 1, 2012, 2 pages.

* cited by examiner

*Primary Examiner* — Son T Hoang
(74) *Attorney, Agent, or Firm* — Foley & Lardner LLP (57) ABSTRACT

Systems and methods for multilingual searching allow search terms to be entered in a first language and searched in another language. A selection of a language may be associated with a search term or phrase in a search query, allowing terms from different languages to be searched at the same time.

17 Claims, 5 Drawing Sheets

SEARCHING IN MULTIPLE LANGUAGES

BACKGROUND

The present disclosure relates generally to searching for text in two or more languages. The present disclosure more specifically relates to configuring a software application, such as a web browser or search engine, to search for text in multiple languages.

Webpages and other forms of electronic documents may be created using text in any number of written languages. The various written languages may also utilize disparate alphabets that may or may not contain the same characters. For example, the Spanish alphabet contains the same letters as that of English, with the additional letter, ñ. Some webpages or other electronic documents may also include text in multiple languages. For example, a webpage from Quebec, Canada, may include text in French and English, which are both official languages in Canada.

Fonts play a role in the representation of languages in electronic documents. For example, two websites may be in the same language, but utilize different font scripts to represent the symbols of the language. Attempts have been made to standardize the fonts used for a particular language in electronic documents. For example, the Unicode Standard includes standards for representing characters in a myriad of different languages. Fonts can also play a role in searching. Many text searching techniques involve matching a particular character in a particular font to the same character in the same font. This further increases the number of possible characters that can be searched, since characters may vary between languages or even within a particular language.

SUMMARY

Implementations of the systems and methods for performing multilingual searching are described herein. One implementation is a computerized method for performing a search in multiple languages. The method includes receiving, at a processing circuit, a search query that includes a first search term, a second search term, and a language selection for the first search term. The method also includes retrieving, from a transliteration database stored in a memory, a transliterated search term using the first search term and the language selection. The transliterated search term is in the selected language. The method further includes determining, by the processing circuit, whether a webpage contains the transliterated search term. The method additionally includes determining, by the processing circuit, using a default language, whether the webpage contains the second search term. The method further includes providing search result data for display by an electronic display, the search result data representing the webpage having the transliterated search term and the second search term.

Another implementation is a system for performing a search in multiple languages. The system includes a processing circuit configured to provide an electronic document for display by an electronic display. The processing circuit is also configured to receive a search query that includes a first search term in a first language, a second search term in the first language, and a language selection for the first search term. The processing circuit is further configured to retrieve, from a transliteration database stored in a memory, a transliterated search term using the first search term and the language selection. The transliterated search term is in the selected language. The processing circuit is also configured to determine whether the electronic document contains the transliterated search term and configured to determine whether the electronic document contains the second search term using a default language. The processing circuit is also configured to provide search result data for display by an electronic display, the search result data representing the electronic document having the transliterated search term and the second search term.

A further implementation is a computerized method for performing a search in multiple languages. The method includes requesting a webpage over a network and providing the webpage for display by an electronic display. The method also includes receiving, from an interface, a search query comprising a first search term and a second search term. The method further includes receiving, from the interface, a language selection for the first search term. The method additionally includes providing a transliteration request over the network to a transliteration database. The transliteration request includes the first search term and the language selection for the first search term. The method also includes receiving, from the transliteration database, a transliterated search term in the selected language for the first search term, in response to providing the transliteration request. The method further includes providing search result data for display by the electronic display, the search result data representing the webpage having the transliterated search term in the selected language and the second search term in a default language.

These implementations are mentioned not to limit or define the scope of this disclosure, but to provide examples of implementations to aid in understanding thereof.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

According to some aspects of the present disclosure, an electronic document (e.g., a webpage, a text file, spreadsheet, etc.) may be searched in a plurality of languages. In a typical software application, such as a web browser, a default language is utilized to search for text in a document. For example, an application may utilize the default language of the device's operating system for text searching. In another example, the default language may be selected when the application is installed on the device. In these and other cases, text searching in an application may be limited to a default language.

The applicants of the present disclosure have noted that a software application may be configured to search for text in multiple languages, but entry of search terms in a non-default language may not be possible or may require the use of additional software and/or hardware to enter a search query in two or more languages. For example, a user may use an interface device (e.g., a keyboard, touchpad, etc.) that supports entering characters in multiple languages. The user may switch the input format of the interface device between the default language and one or more other languages, to search in a non-default language. In another example, a user may install transliteration software to aid in the entry of text in a non-default language. To perform a text search in a language other than in the default language, the user may still have to cut and paste transliterated terms from the transliteration program into a search field.

In some implementations described herein, a software application (e.g., a web browser, a text editor, a document viewer, etc.) may be configured to allow entry of a search term and a selection of a search language associated with the search term. The search term may be transliterated into the selected search language and the document (e.g., a web page, a text document, etc.) may be searched using the transliterated term. In some implementations, searching may be performed across multiple languages. A search language may be associated with each search term, allowing terms to be searched in different languages. For example, a text search may be performed for a first term in a first language and a second term in a second language. In this way, a user viewing content that contains multiple languages can seamlessly search for text across the presented languages.

Figure 1:
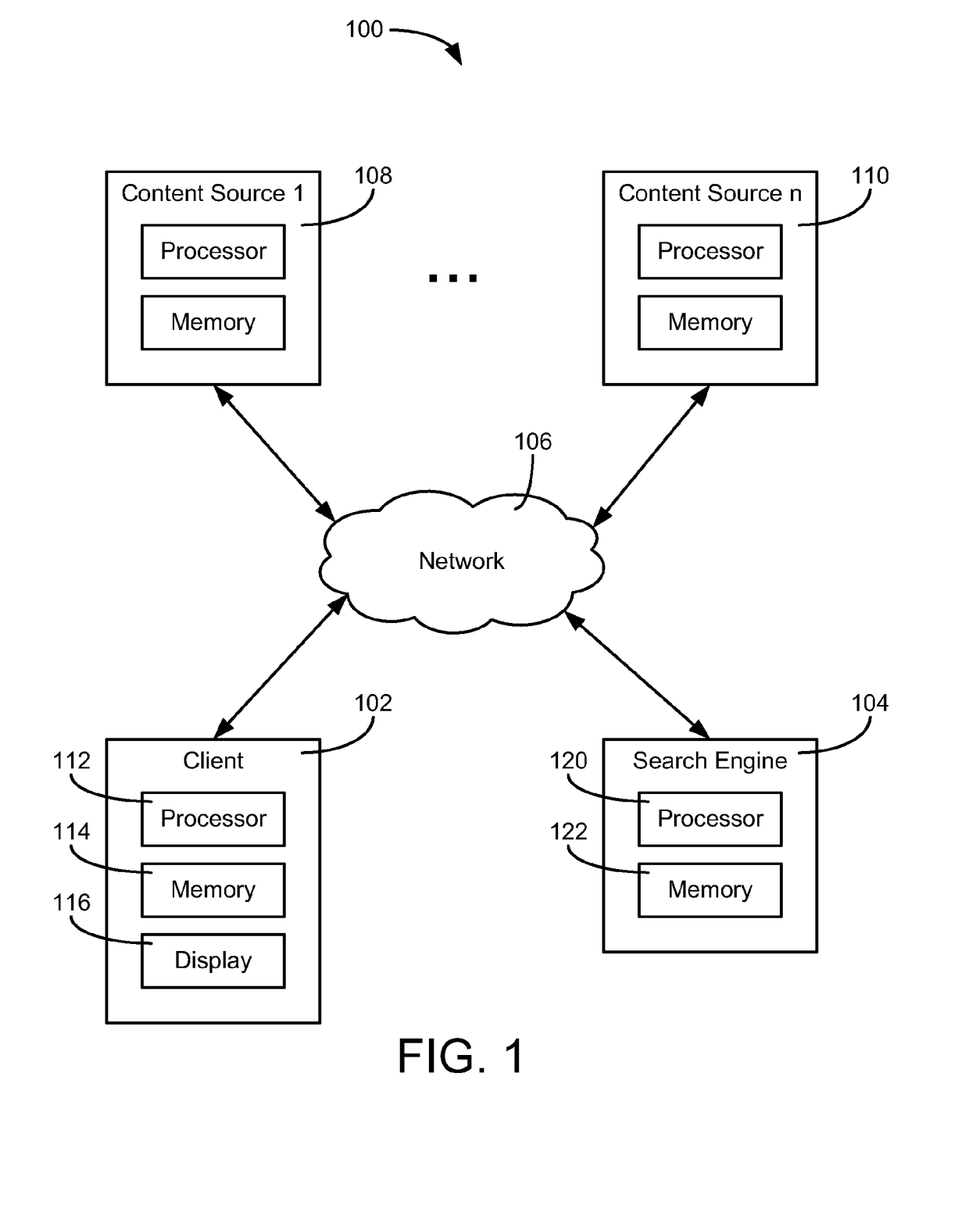
FIG. 1 is a block diagram of a computer system in accordance with a described implementation.

Referring to FIG. 1, a block diagram of a computer system 100 in accordance with a described implementation is shown. System 100 includes a client 102 which communicates with other computing devices via a network 106. For example, client 102 may communicate with one or more content sources ranging from a first content source 108 up to an nth content source 110. Content sources 108, 110 may provide webpages and/or other content (e.g., text documents, PDF files, and other forms of electronic documents) to client 102. System 100 may also include a search engine 104, which provides network address information (e.g., a URL, an IP address, an FTP address, etc.) of content sources 108, 110 to client 102 over network 106. For example, client 102 may provide one or more search terms to search engine 104. In response, search engine 104 may provide address information for one or more webpages or other content available from content sources 108, 110 to client 102.

Network 106 may be any form of computer network that relays information between client 102, search engine 104, and content sources 108, 110. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client 102 may communicate wirelessly (e.g., via WiFi, cellular, radar, etc.) with a transceiver that is hardwired (e.g., via a fiber optic cable, a CAT5 cable, etc.) to other computing devices in network 106.

Client 102 may be of any number of different types of user electronic devices configured to communicate via network 106 (e.g., a laptop computer, a desktop computer, a tablet computer, a smartphone, a digital video recorder, a set-top box for a television, a video game console, etc.). Client 102 is shown to include a processing circuit, which may comprise a processor 112 and a memory 114. Memory 114 stores machine instructions that, when executed by processor 112, cause processor 112 to perform one or more of the operations described herein. Processor 112 may include a microprocessor, ASIC, FPGA, etc., or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ASIC, FPGA, ROM, RAM, EEPROM, EPROM, flash memory, optical media, or any other suitable memory from which processor 112 can read instructions. The instructions may include code from any suitable computer programming language such as, but not limited to, C, C++, C#, Java, JavaScript, Perl, Python and Visual Basic.

Client 102 may include one or more user interface devices. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to the housing of client 102 (e.g., a built-in display, microphone, etc.) or external to the housing of client 102 (e.g., a monitor connected to client 102, a speaker connected to client 102, etc.), according to various implementations. For example, client 102 may include an electronic display 116, which visually displays webpages and other electronic documents using data received from content sources 108, 110, and/or search engine 104.

Content sources 108, 110 are electronic devices connected to network 106 that may provide content to client 102. For example, content sources 108, 110 may be computer servers (e.g., FTP servers, file sharing servers, web servers, etc.) or other devices that include processing circuits. Content may include, but is not limited to, webpage data, a text file, a spreadsheet, images, and other forms of electronic documents. Similarly, search engine 104 may include a processing circuit including a processor 120 and a memory 122 configured to provide a webpage to client 102. The webpage may include one or more text fields that allow client 102 to generate a search query. Search engine 104 may receive the search query from client 102 via network 106 and provide data indicative of one more network addresses of content sources 108, 110 to client 102. For example, client 102 may request a search webpage from search engine 104 and receive the search webpage, in response. The search webpage may then be used at client 104 to create a search query and to send the search query to search engine 104. In response, search engine 104 may determine one or more network addresses of content on content sources 108, 110 and provide webpage data to client 102 that includes a hyperlink or other address information for the content.

Figure 2:
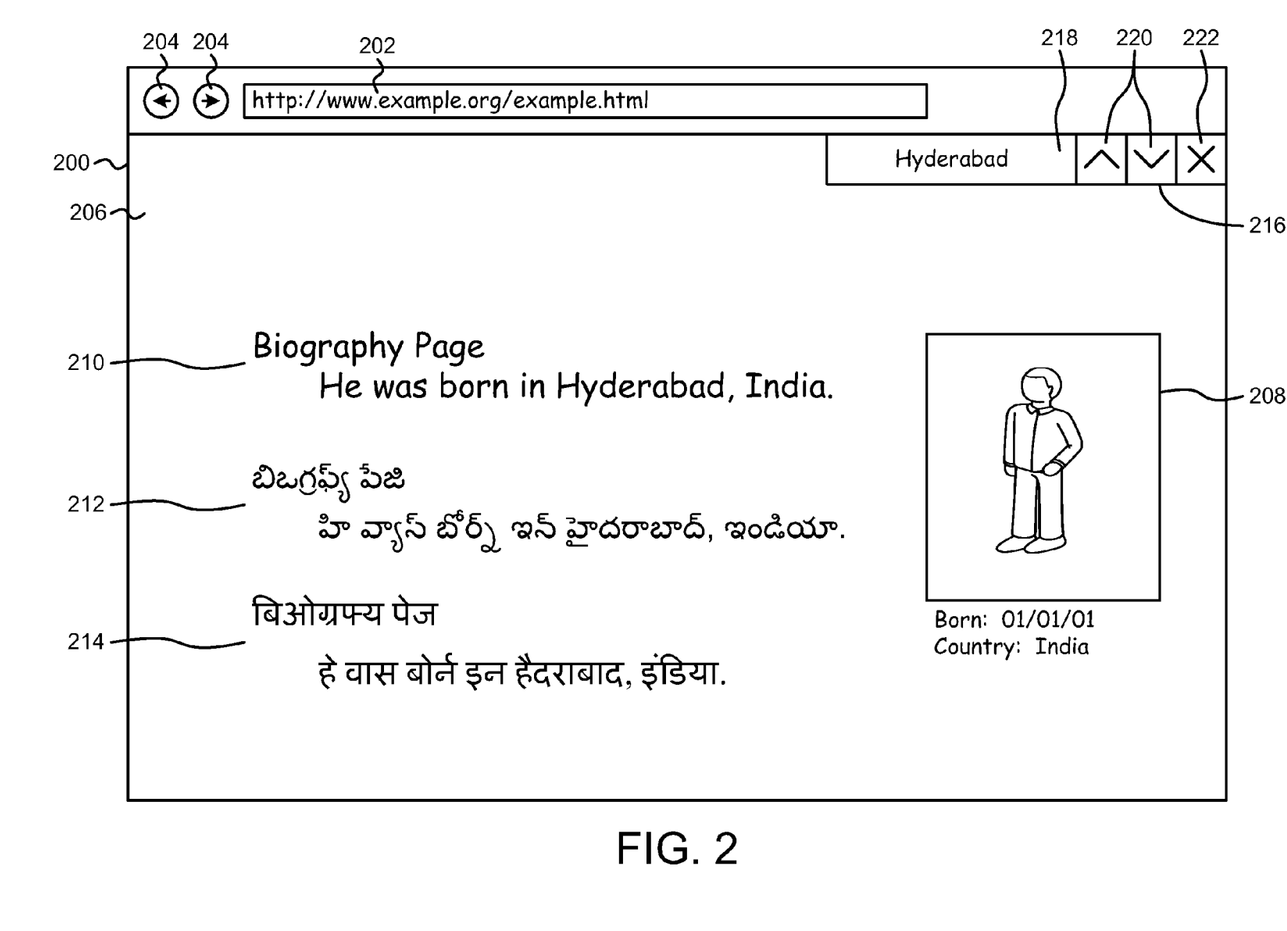
FIG. 2 is an illustration of an example display of a web browser having a text search utility.

Referring now to FIG. 2, an example display 200 is shown. Display 200 is in electronic communication with one or more processors that cause visual indicia to be displayed by display 200. Display 200 may be located inside or outside of the same housing as that of the one or more processors. For example, display 200 may be external to a desktop computer (e.g., display 200 is a monitor), may be a television set, or may be any other stand-alone form of electronic display. In another example, display 200 may be internal to a laptop computer, mobile device, or other computing device having an integrated display.

As shown in FIG. 2, the one or more processors in communication with display 200 may execute a software application, such as a web browser (e.g., display 200 is part of a client device). The web browser operates by receiving input of a resource name or network address into a field 202, such as a web address, from an input device (e.g., a pointing device, a keyboard, a touchscreen, etc.). In response, the one or more processors executing the web browser may request data over a network (e.g., the Internet, an intranet, etc.) from a content source corresponding to the resource name or network address. The content source may provide webpage data and/or other data to the client device and used to cause visual indicia to be displayed by display 200.

In general, webpage data may include text, hyperlinks, layout information, and other data that is used to provide the framework for the visual layout of displayed webpage 206. In some implementations, webpage data may be one or more files in a markup language, such as the hypertext markup language (HTML), extensible HTML (XHTML), extensible markup language (XML), or any other markup language. For example, the webpage data in FIG. 2 may include a file, "example.html" provided by the website, "www.example.org." The webpage data may include data that specifies where indicia appears on webpage 206, such as image 208 or other visual objects. In some implementations, the webpage data may also include additional information used by the client device to retrieve additional indicia displayed on webpage 206. For example, the file, "example.html," may include network address information for the location of image 208.

The web browser providing display data to display 200 may include a number of navigational controls associated with webpage 206. For example, the web browser may include the ability to go back or forward to other webpages using inputs 204 (e.g., a back button, a forward button, etc.). In various implementations, inputs 204 may retrieve webpage data again from a content source over a network or may retrieve previously displayed webpage data from a local cache.

The web browser may include a search utility 216 configured to locate search terms entered into an input field 218 on webpage 206. Search utility 216 may be a popup window, a set of tools embedded into the web browser, etc. For example, search utility 216 may be displayed when a dropdown menu is selected to perform a search. In another example, search utility 216 may be displayed on entry of a certain combination of keys (e.g., CTRL+F, etc.). In some implementations, search utility 216 may include a button 222 configured to hide or close search utility 216. Input field 218 is configured to receive one or more search terms from an interface device (e.g., a keyboard, a keypad, a touchscreen display, a microphone, etc.). Search utility 216 may search for the one or more search terms on webpage 206 in response to receiving a search command (e.g., selection of an enter key, selection of a displayed search button, etc.). In some implementations, search utility 216 may provide indicia of the number of matches of the search terms on webpage 206. Search utility 216 may include navigation buttons 220 configured to reposition the display of webpage 206 on display 200 to focus on a particular instance of a search term on webpage 206. For example, navigation buttons 220 may be used to search up or down on webpage 206 until the next matching word is found. In some implementations, search utility 216 may highlight a matching search term on webpage 206 or provide other visual indicia of a match (e.g., by changing the color of the matching word, by displaying an icon near the matching word, etc.).

In some cases, webpage 206 may contain text in any number of different languages. For example, webpage 206 may contain text 210 in English, text 212 in Telugu, and text 214 in Hindi. Texts 210, 212, 214 may be different transliterations of one another or may contain unrelated text. In some implementations, one or more of texts 210, 212, 214 may be encoded using an encoding that conforms to a Unicode standard (e.g., UTF-8, UTF-16, etc.).

In some implementations, a default language may be associated with search utility 216. For example, a default language may be associated with the web browser providing display data to display 200 and/or the operating system running the web browser. In such a case, a search term may be entered into input field 218 in the default language using an interface device. For example, the search term, "Hyderabad," may be entered in English into input field 218, if English is the default language. Search utility 216 may then be used to search text on webpage 206 for occurrences of "Hyderabad."

Entry of terms into a search field in a language other than that of the default language may be prevented in some systems or may involve a number of complicated steps. For example, a user wishing to search for the Telugu transliteration of "Hyderabad," i.e., "హైదరాబాద్," may be unable to do, if the default language is English. In some systems, a user may still search for a term in a non-default language, but is prevented from directly entering the search terms in the non-default language. Even if the non-default search term is entered using additional software and/or hardware, a system may still not support utilizing a search query that includes terms across multiple languages. For example, a possible search query may include the Telugu word for Hyderabad and "India" in English, e.g., a search query of "హైదరాబాద్ India."

According to various implementations, a search query may be entered in a default language. A language selection may be associated at the individual word or phrase level of the entered search query. For example, a search query of "Hyderabad India" in English may include a selection that the term "Hyderabad" is to be searched in Telugu. Such a methodology allows search terms to be entered without the need for additional software and/or hardware and also supports search queries that include terms in multiple languages.

Figure 3:
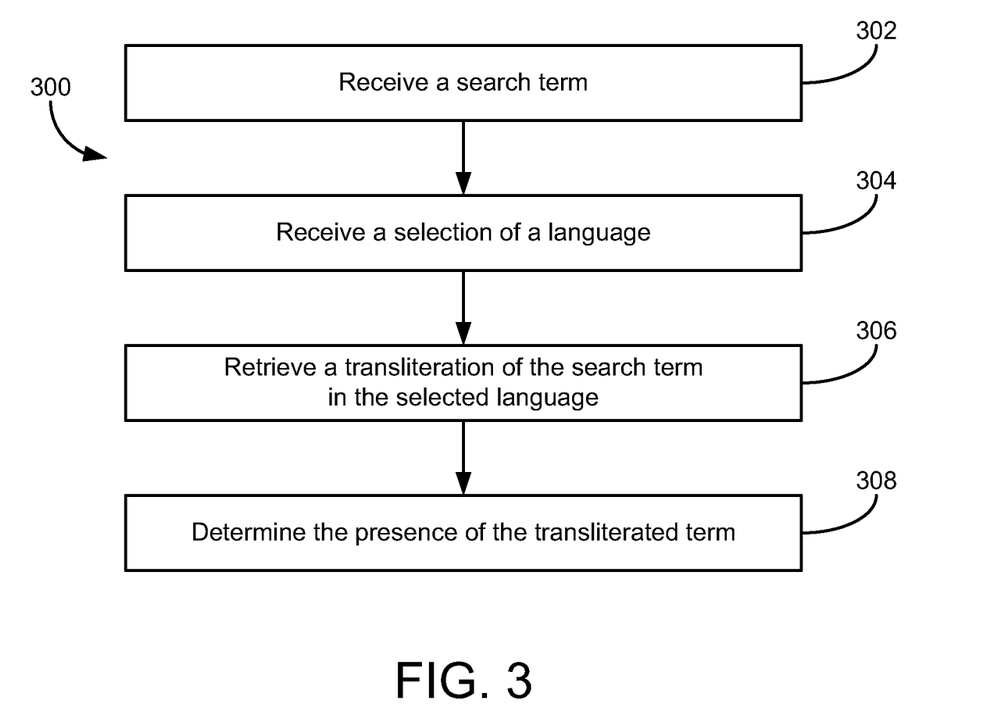
FIG. 3 is an example process for performing a text search in a non-default language.

FIG. 3 is an example process 300 for performing a text search in a non-default language. Process 300 may be utilized, for example, by a web browser, text editor, or other application that displays text, according to various implementations. In some implementations, process 300 may be utilized by a search engine to allow searching for content over a network in a plurality of languages. In some implementations, a system that includes a client and one or more remote devices may utilize process 300 to provide seamless text searching across one or more non-default languages.

Process 300 includes receiving a search term (block 302). A search query may include one or more search terms. According to various implementations, the one or more search terms in a search query may be received in a default language. For example, if English is the default language for search queries in an application, a search query may be received in English from a QWERTY keyboard, an English-alphabet touchpad, etc. In general, a search query may be used by a search utility (e.g., a search function within an application, a search engine on the Internet, etc.) to locate search terms in the search query within one or more electronic documents. For example, a search query may be used to locate search terms on a displayed webpage or other file containing text. In another example, a search query may be used by a search engine to locate files and other content on a network that contain the search terms.

Process 300 includes receiving a selection of a language (block 304). A selected language may be associated with one or more search terms in a search query. For example, a first search term may have an associated language of English, a second search term may have an associated language of Telugu, and the remaining search terms may have an associated language of Hindi. In such a case, the various search terms may be used to search in the specified languages. In some implementations, each search term may have a specified language (i.e., searching in the default input language requires a selected search language). In some implementations in which a default language is utilized, only terms that are to be searched in a non-default language may have an associated selected language. In some implementations, one or more search languages may be selected as a default search language. For example, a user may enter search queries in English and specify that searches are to be performed for the entered terms in both English and in Hindi.

A language may be selected in any number of ways. In one implementation, language codes may be used to specify a search language for a term or phrase in the search query. For example, the prefix "te:" may be used to denote that a search term is to be searched in Telugu. In another example, the prefix "hi:" may be used to denote that a search term is to be searched in Hindi. Using such language prefixes, a possible search query may be "hi: airport" to search for the Hindi word for "airport." In some implementations, a language prefix may apply to all terms after the prefix until another prefix is entered. For example, the search query "hi: Mahatma Gandhi" may be used to search for the Hindi words for "Mahatma Gandhi." In some implementations, a search query may be used to search for terms across multiple languages. For example, the search query "te: Indira Gandhi en: Katherine Frank" may be used to search for the Telugu transliteration of "Indira Gandhi" and the phrase "Katherine Frank" in English. Such a query may be used, for example, to search a multilingual webpage for information about the biography of Indira Gandhi written by Katherine Frank.

In some implementations, the selection of a language may be received from an interface device via selection of an icon, button, or other selectable area of a graphical user interface. For example, a user may be able to select a first button associated with Telugu when entering search terms that are to be searched in Telugu. The user may then select a second button associated with Hindi when entering search terms that are to be searched in Hindi. Other ways of selecting a language are contemplated including receiving a voice command from a microphone, using text suffixes in the search query (e.g., using a search query of "Indira Gandhi-te" to search for "Indira Gandhi" in Telugu), and selecting one or more hotkeys on a keyboard or keypad (e.g., selecting CTRL-ALT-T to search for terms in Telugu and CTRL-ALT-H to search for terms in Hindi).

Process 300 includes retrieving a transliteration of the search term in the selected language (block 306). A transliteration database stored in a local memory or accessed over a network may be used to retrieve a transliteration of the search term in the selected language. The transliteration database may contain a mapping of words in the input language to that of the selected language. For example, an English-Telugu database may include an entry that maps the English word, "Hyderabad," to the Telugu word "హైదరాబాద్." In some implementations the transliteration database may include entries that conform to a Unicode standard. Unicode standard fonts are widely adopted, thereby increasing the chance that a transliterated word matches text in a particular document. In some implementations, the transliteration database may contain non-Unicode fonts in addition to, or in lieu of, Unicode fonts.

Process 300 includes determining the presence of the transliterated term (block 308). In implementations in which the search utility is part of an application, the presence of the transliterated term in an electronic document may be determined. For example, a displayed webpage may be searched for the transliterated term by a web browser. In another example, a text editor or other application for viewing documents may search a document for the presence of the transliterated term. In implementations in which the search utility is a search engine, a ranking algorithm may be used to determine a set of one or more network addresses of electronic documents that contain some or all of the search terms.

In some implementations, search terms in two or more languages may be searched using a single search query. For example, a webpage may be searched for some search terms in Hindi and other search terms in English. One of the search languages may or may not be the default language in which the search terms were entered. For example, search terms may be entered in English, if English is the default language for the search. However, the search may be performed in one or more languages other than English, depending on the selected languages. In some implementations, a search may be performed for a term in both the default language and in a selected language. For example, a search query of "te: Hyderabad" may be used in some implementations to search for "Hyderabad" in both Telugu and in English. In other implementations, a primary input language and one or more other default search languages may be selected. For example, a user may be able to specify that English is to be used to enter search terms and that the terms are to be searched in both English and Hindi if a language is not selected, by default.

Figure 4:
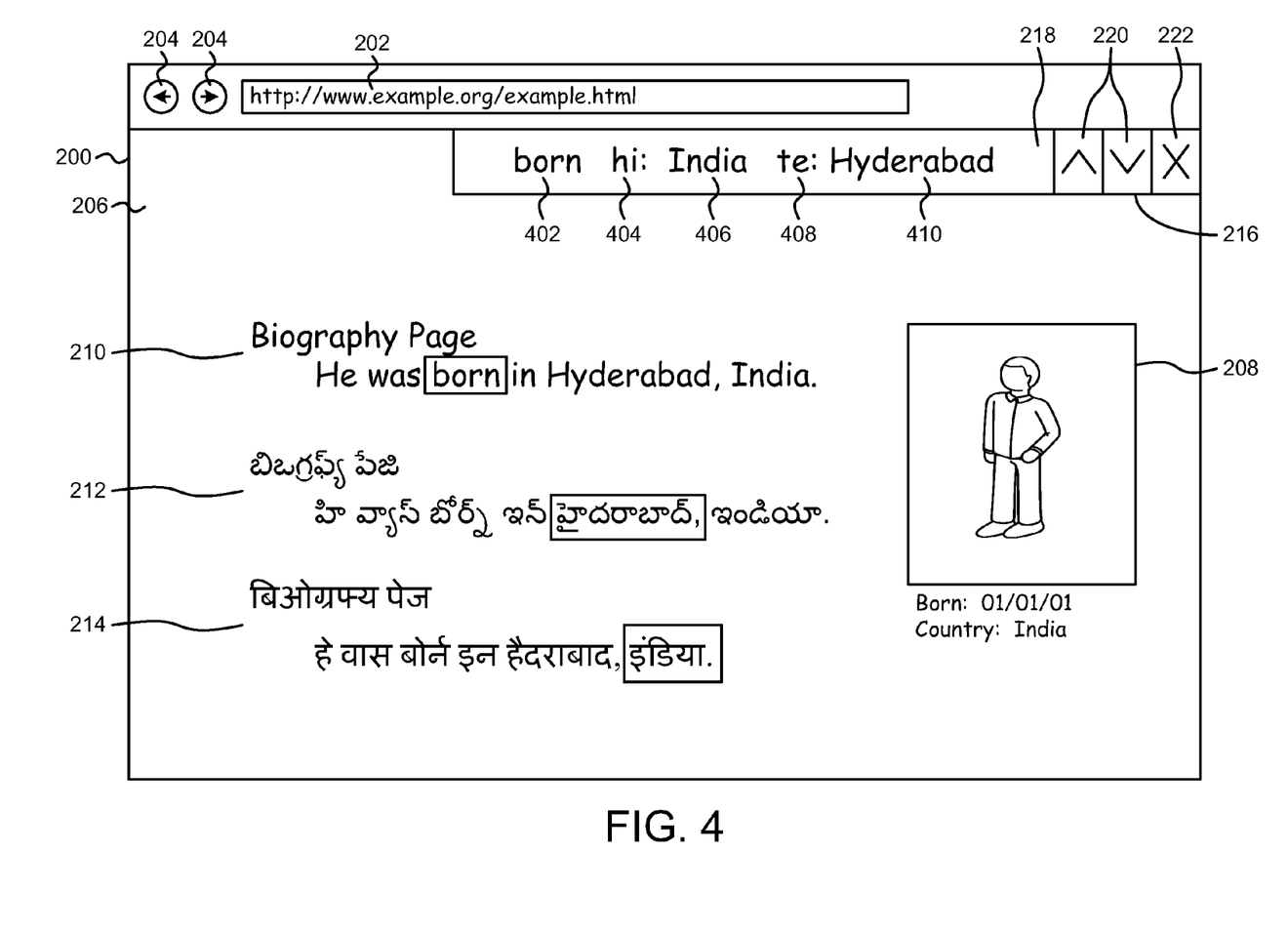
FIG. 4 is an illustration of an example display of a web browser searching for text in multiple languages.

FIG. 4 shows display 200 displaying a web browser configured to search for text in multiple languages. As shown, webpage 206 containing texts 210, 212, 214 in English, Telugu, and Hindi is displayed on display 200. Search utility 216 may be configured to accept search terms in a default language and one or more language selections for the search terms, according to various implementations. For example, input field 218 may utilize English as the default input language. Thus, a user entering a search query into input field 218 may do so in a single language, reducing the number of steps required to search for text in a non-default language. For example, search terms 402, 406, 410 (e.g., "born," "India," and "Hyderabad," respectively) may be entered in English, if English is the default language for the web browser.

Search utility 216 may also be configured to receive a selection of a language for one or more of search terms 402, 406, 410. For example, a language selection 404 may specify that search term 406 is to be searched in Hindi, while a language selection 408 may specify that search term 410 is to be searched in Telugu. In some implementations, search utility 216 may be configured to search in the default language and/or in other default search languages, if no language selection is associated with a search term. For example, search term 402 may be searched in the default language of English, if no language selection is associated with search term 402. In another example, search term 402 may be searched in both English and Telugu, if English and Telugu are both selected as default search languages.

Search utility 216 may retrieve transliterated search terms from one or more transliteration databases using a search term and a selected language. In one implementation, a transliteration database may be stored in the memory of the client device that provide display data to display 200. For example, the transliteration database may be part of the web browser application displayed on display 200. In another implementation, search utility 216 may be configured to access a remote transliteration database over a network, to retrieve transliterations of the search terms. For example, a transliteration database may be provided as a resource on the Internet by the manufacturer of the web browser or another entity. In such a case, search utility 216 may be configured to send a transliteration request to the remote database and to receive the transliterated search terms. In some implementations, a search term in input field 218 may be replaced with its retrieved transliteration. In other implementations, some or all of the originally entered search query may appear in input field 218 after a transliterated term is retrieved.

Search utility 216 may be configured to utilize a search query and one or more selected languages entered via input field 218, to determine the presence of search terms and/or transliterated search terms on webpage 206. For example, texts 210, 212, 214 may be searched for the word "born" in English, the word "India" in Hindi, and the word "Hyderabad" in Telugu. In some implementations, a search query may only search for a conjunctive phrase. For example, search utility 216 may only search for the full set of entered search terms to determine if the terms appear in sequence on webpage 206. In some implementations, words or phrases of a search query entered into input field 218 may be searched individually on webpage 206. For example, search term 402 may be matched in text 210, search term 402 may be matched in text 214, and search term 410 may be matched in text 212.

In some implementations search utility 216 may provide visual indicia on display 200 regarding the results of the text search. For example, search utility 216 may display the number of matches of search terms on webpage 206 (e.g., a count of how many times a search term, phrase, or query appears on webpage 206). In some implementations, navigation buttons 220 may be used to cycle among matching terms on webpage 206. Indicia may also be displayed on webpage 206 to signify a matching term. For example, search term 402 (e.g., the English word "born") may be highlighted in text 210, to signify a term match. Indicia of matches with transliterated search terms may also be displayed on webpage 206. For example, the Hindi transliteration of search term 406 (e.g., the English word "India") may be highlighted in text 214 and the Telugu transliteration of search term 410 (e.g., the English word "Hyderabad") may be highlighted in text 212. In other implementations, indicia of a match may be a coloration of a matching term, an icon, a cursor position, or any other form of visually indicating that a search term has been found in an electronic document.

Figure 5:
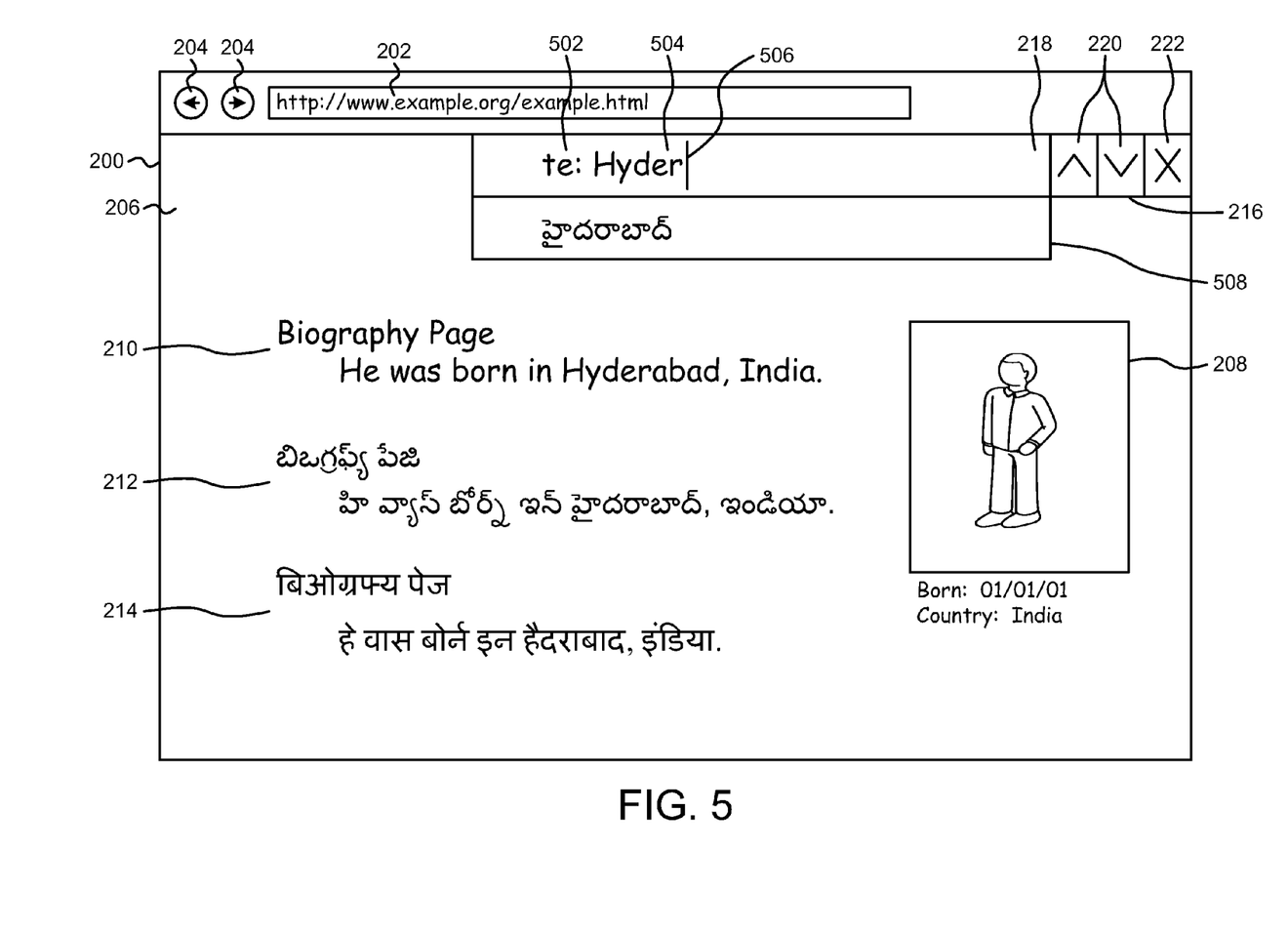
FIG. 5 is an illustration of an example display of a web browser providing a suggested transliterated search term.

FIG. 5 shows display 200 displaying a web browser providing a suggested transliterated search term. In some implementations, search utility 216 may be configured to provide a display of suggested terms and/or to display transliterated terms for review. Suggested search terms may, for example, reduce the amount of input needed for a user to enter a search query. Suggesting search terms and/or displaying transliterated search terms for review may also allow a user to correct spelling errors in the search query, during entry of a search query.

In some implementations, search utility 216 is configured to suggest one or more search terms via field 508. Field 508 may be a dropdown box, a popup window, or any other form of visual field to convey suggested terms to the user via display 200. Field 508 may provide suggested terms during or after the entry of a search term in the default language or in a selected language, according to various implementations. In one example, a search term 504 (e.g., "Hyderabad") may be partially entered with a language selection 502 (e.g., cursor 506 is directly adjacent to the search term being entered). During entry of search term 504, field 508 may display one or more suggested terms. The terms displayed in field 508 may be in the default language or in another language, if a non-default language has been specified. For example, entry of "Hyder" into input field 218 of search utility 216 may cause field 508 to display "Hyderabad" in English or in Telugu as a suggestion. Selection of a suggested search term may cause search utility 216 to automatically complete the text in input field 218 in the default language or in a specified language, according to various implementations.

Suggested terms may be retrieved by referencing the entered portion of a search term in a database of terms stored locally or over a network. For example, a list of most commonly used words or phrases that begin with the same letters as those entered may be retrieved from the database. In some implementations, a corrected spelling may be suggested. For example, "Hyderabad" may be suggested in field 508 on entry of "Hybera" in input field 218 of search utility 216. Corrected spelling suggestions may also be presented in a non-default language, if one is selected. For example, entry of "te: Hybera" may also cause the Telugu word for "Hyderabad" to appear in field 508.

In some implementations, field 508 or the like may allow a user to review a transliterated search term after entry of a search term in input field 218. For example, after the user places a space between the end of a search term and the beginning of the next term (e.g., there exists a space between cursor 506 and the end of the previously entered search term), a transliterated search term may be retrieved and presented in field 508 for review. The user may choose to revise the search term entered into input field 218, if the transliterated term in field 508 is not the intended term or phrase. In this way, a user is able to review and revise search terms during entry of the search query.

In some implementations, a transliterated term may be presented in input field 218 after entry of a search term. For example, entry of "te: Hyderabad" in input field 218 may cause the Telugu word to appear directly in input field 218. Selection of a backspace button may cause the originally entered term (e.g., in the default input language) to reappear. In this way, spelling mistakes may be corrected in the default input language and the transliterated search term can also be verified by the user.

In some implementations, the functionality of search utility 216 may be integrated into field 202. For example, field 202 may be associated with a search engine and accept search terms, in addition to resource names or network addresses. The search terms entered into field 202 may be passed to the associated search engine, thereby returning results to the web browser (e.g., replacing displayed webpage 206 with the search results). The search results may, for example, be a listing of hyperlinks to webpages that contain text corresponding to the search terms entered into field 202 in the selected languages.

While some implementations are described herein with reference to performing text searching in a webpage, it is to be appreciated that other implementations may also utilize the described methodologies. In some implementations, search utility 216 may be part of a text editor or other application configured to display a document. For example, search utility 216 may be integrated into a spreadsheet application to allow multilingual searches to be performed. In other implementations, the functionality of search utility 216 may be integrated into an Internet search engine to allow searching for Internet content in multiple languages using a single input language to enter a search query.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. For example, while certain implementations are described herein with respect to routing data in a data network, the methodologies described could also be applied to other areas, such as determining the best routes of a map that may be traveled by a person or vehicle. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computerized method for performing a search in multiple languages comprising:
   receiving, at a processing circuit, a search query comprising a first search term in a default language, a second search term in the default language, and a language selection for transliteration of the first search term specified by a user, wherein the first search term, the second search term, and the language selection are manually entered via a single text input field, and wherein the language selection comprises a prefix or a suffix for the first search term, the prefix or suffix comprising text adjacent to the first search term within the single text input field;
   retrieving, from a transliteration database stored in a memory, a transliterated search term using the first search term and a selected language, wherein the transliterated search term is a spelling of the first search term using one or more corresponding characters from an alphabet of the selected language;
   determining, by the processing circuit, whether a webpage contains the transliterated search term;
   determining, by the processing circuit, using the default language, whether the webpage contains the second search term, wherein the default language differs from the selected language; and
   providing search result data for display by an electronic display, the search result data representing the webpage having both the transliterated search term in the selected language and the second search term in the default language.

2. The method of claim 1, wherein the search result data is configured to cause the electronic display to display indicia based in part on whether the webpage contains the transliterated search term and based in part on whether the webpage contains the second search term.

3. The method of claim 2, wherein the indicia comprises a highlighting of the transliterated search term on the displayed webpage.

4. The method of claim 1, wherein the transliterated search term is retrieved from the transliteration database over a network.

5. The method of claim 1 further comprising:
   receiving a partial entry of the first search term;
   retrieving one or more suggested search terms based in part on the partial entry of the first search term; and
   providing the one or more suggested search terms to the electronic display.

6. The method of claim 5, wherein the one or more suggested search terms comprise a corrected spelling of the first search term.

7. The method of claim 1, further comprising:
   providing the transliterated search term for display on the electronic display, in response to receiving the first search term and the language selection.

8. The method of claim 1, further comprising:
   determining, by the processing circuit, whether the webpage contains the first search term, wherein the search result data is further configured to cause the electronic display to display indicia based in part on whether the webpage contains the first search term.

9. A system for performing a search in multiple languages comprising:
- at least one computer processor configured to provide an electronic document for display by an electronic display, wherein the at least one computer processor is configured to:
  - receive a search query from a user, the search query comprising a first search term in a default language, a second search term in the default language, and a language selection for transliteration of the first search term, wherein the first search term, the second search term, and the language selection are manually entered via a single text input field, and wherein the language selection comprises a prefix or a suffix for the first search term, the prefix or suffix comprising text adjacent to the first search term within the single text input field,
  - retrieve, from a transliteration database stored in a memory, a transliterated search term using the first search term and a selected language, wherein the transliterated search term is a spelling of the first search term using one or more corresponding characters from an alphabet of the selected language,
  - determine whether the electronic document contains the transliterated search term in the selected language and the second search term in the default language, wherein the default language differs from the selected language, and
  - provide search result data for display by an electronic display, the search result data representing the electronic document having the transliterated search term and the second search term.

10. The system of claim 9, wherein the transliterated search term is retrieved from the transliteration database over a network.

11. The system of claim 9, wherein the at least one computer processor is further configured to receive a partial entry of the first search term and to retrieve one or more suggested search terms based in part on the partial entry of the first search term, wherein the at least one computer processor is further configured to provide the one or more suggested search terms to the electronic display.

12. The system of claim 9, wherein the at least one computer processor is further configured to provide the transliterated search term for display on the electronic display, in response to receiving the first search term and the language selection.

13. The system of claim 9, wherein the at least one computer processor is further configured to determine whether the electronic document contains the first search term in the default language, wherein the search result data is further configured to cause the electronic display to display the indicia based in part on whether the electronic document contains the first search term in the default language.

14. A computerized method for performing a search in multiple languages comprising:
- requesting a webpage over a network;
- providing the webpage for display by an electronic display;
- receiving, from a user interface, a search query in a default language comprising a first search term and a second search term;
- receiving, from the user interface, a language selection for transliteration of the first search term;
- wherein the first search term, the second search term, and the language selection are manually entered via a single text input field, and wherein the language selection comprises a prefix or a suffix for the first search term, the prefix or suffix comprising text adjacent to the first search term within the single text input field;
- providing a transliteration request over the network to a transliteration database, wherein the transliteration request comprises the first search term and a selected language for the first search term;
- receiving, from the transliteration database, a transliterated search term in the selected language for the first search term, in response to providing the transliteration request, wherein the transliterated term is a spelling of the first search term in the selected language using one or more corresponding characters from an alphabet of the selected language; and
- providing search result data for display by the electronic display, the search result data representing the webpage having the transliterated search term in the selected language and the second search term in the default language, wherein the selected language differs from the default language.

15. The method of claim 14, further comprising:
- providing the transliterated search term for display by the electronic display;
- receiving, from the interface, an adjustment to the first search term;
- providing a second transliteration request over the network to a transliteration database, wherein the transliteration request comprises the adjusted first search term and the selected language;
- receiving, from the transliteration database, a second transliterated search term in the selected language, in response to providing the second transliteration request; and
- providing adjusted search result data for display by the electronic display, wherein the adjusted search result data is configured to cause the electronic display to display indicia based in part on whether the webpage contains the second transliterated search term or the second search term.

16. The method of claim 14, wherein search query further comprises a third search term in the default language, the method further comprising:
- receiving, from the interface, a language selection for the third search term that differs from the language selection for the first search term;
- providing a second transliteration request over the network to the transliteration database, wherein the second transliteration request comprises the third search term and a selected language for the third search term;
- receiving, from the transliteration database, a second transliterated search term in the selected language for the third search term, in response to providing the transliteration request; and
- wherein the search result data is further configured to cause the electronic display to display indicia based in part on whether the webpage contains the second transliterated term, wherein the selected language for the second search term differs than the selected language for the third search term.

17. The method of claim 14, further comprising:
- providing the transliterated search term for display on the electronic display, in response to receiving the transliterated search term from the transliteration database.

* * * * *